(12) United States Patent
Girard et al.

(10) Patent No.: US 7,549,648 B2
(45) Date of Patent: Jun. 23, 2009

(54) HUMAN-POWERED, HANDS-FREE, MANEUVERABLE, MULTI-USE TRAILER

(76) Inventors: Daniel Girard, 218 Dawlish Pl., Santa Barbara, CA (US) 93108; Christopher Riccio, 859 W. Foothill Rd., Glendora, CA (US) 91740; Philip Tomasi, 4997 Via Santan, Newbury Park, CA (US) 91320

( * ) Notice: Subject to any disclaimer, the term of this patent is extended or adjusted under 35 U.S.C. 154(b) by 70 days.

(21) Appl. No.: 11/810,284

(22) Filed: Jun. 5, 2007

(65) Prior Publication Data

US 2007/0290460 A1 Dec. 20, 2007

Related U.S. Application Data

(60) Provisional application No. 60/810,843, filed on Jun. 5, 2006.

(51) Int. Cl.
*B62D 51/04* (2006.01)
(52) U.S. Cl. .................. 280/1.5; 280/47.32; 224/184
(58) Field of Classification Search ............ 280/1.5, 280/35, 47.11, 47.17, 47.34, 47.32; 224/184
See application file for complete search history.

(56) References Cited

U.S. PATENT DOCUMENTS

| | | | | |
|---|---|---|---|---|
| 4,236,723 A | * | 12/1980 | Lemmon | 280/1.5 |
| 4,261,590 A | * | 4/1981 | Schupbach | 280/47.31 |
| 5,385,355 A | * | 1/1995 | Hoffman | 280/1.5 |
| 5,433,462 A | * | 7/1995 | Groleau | 280/38 |
| 5,903,997 A | * | 5/1999 | Jacob | 43/1 |
| 6,139,033 A | * | 10/2000 | Western | 280/47.23 |
| 6,361,063 B1 | * | 3/2002 | Daeschner | 280/655 |
| 6,935,643 B1 | * | 8/2005 | Purpuro | 280/47.32 |
| 7,322,584 B1 | * | 1/2008 | Parker | 280/47.131 |
| 2006/0237918 A1 | * | 10/2006 | Satorius | 280/1.5 |

\* cited by examiner

*Primary Examiner*—Tony H. Winner
(74) *Attorney, Agent, or Firm*—Stephen D. Carver

(57) ABSTRACT

A highly maneuverable, multi-use, human-powered cart for comfortably transporting substantial loads. A cargo basket is defined between upper and lower subframes forming a rigid, low-profile frame at the middle of the trailer. The frame rear terminates in a pair of articulated forks supporting a large wheel that bears most of the cargo weight. An adjustable and pivoted yoke assembly at the front of the frame supports an articulated harness assembly worn by the user. The yoke assembly preferably comprises an upwardly angled yoke tube slidably coupled and pivoted to the frame front at the tube's lower end. Height adjustments are facilitated by the slidably adjustable yoke tube relative to the frame to accommodate various user heights. The device folds for storage or for carrying on the users back while crossing challenging terrain.

17 Claims, 18 Drawing Sheets

HUMAN-POWERED, HANDS-FREE, MANEUVERABLE, MULTI-USE TRAILER

CROSS-REFERENCE TO RELATED APPLICATION

This utility patent application is based upon, and claims the priority filing date of previously-filed, copending U.S. Provisional patent application entitled "Human-Powered, Hands-Free, Maneuverable, Multi-Use Trailer," filed Jun. 5, 2006, Ser. No. 60/810,843.

FIELD OF THE INVENTION

The present invention relates generally to human-powered trailers or carts for hauling miscellaneous articles. More particularly, the present invention relates to hands-free, wheeled carts towed by human operators that distributes weight between its wheels and the hips of the user.

DESCRIPTION OF THE RELATED ART

Backpacks and other carrying packs are well known. However, conventional backpacks, especially when burdened with a heavy load, such as a large quantity of books or backpacking gear, for example, place excessive stress upon the user's back and spinal regions. When the load shifts, or as time passes, contact of the load with spinal areas of a users back can result in pain and discomfort.

Numerous wheeled article carriers including trailers, wagons, and the like are known in the art for hauling various diverse loads. However, no known human-powered trailer distributes weight evenly between the trailing wheeled section and the hips of the person towing the device.

More particularly, no known trailer built for human towing combines a central frame that is pivoted to a rear wheel system, with a front yoke pivoted to a harness assembly for human towing that connects to the hip region below the back. No known apparatus provides such a trailer that is capable of being folded into a convenient configuration for stowage or transportation.

BRIEF SUMMARY OF THE INVENTION

Our invention provides a highly maneuverable, multi-use, human-powered trailer or cart for comfortably transporting substantial loads. The wheeled trailer replaces typical backpacks, and avoids the back strain often associated by them. At the same time our trailer provides a comfortable and stable cart for dynamically hauling relatively substantial loads without back strain and with minimal physical effort. Weight is distributed upon the wheel or wheels at the cart rear, and upon the hips, of the user to promote stability and minimize physical strain. The hips comprise the core and the strongest section of the human skeleton A cargo basket is defined by a rigid, low-profile frame forming the middle of the trailer. The frame rear terminates in a pair of articulated forks supporting, in the best mode, a single, lightweight wheel, such as a twenty to thirty inch diameter bicycle wheel. The wheel(s) at the rear carry a significant portion of the load. Preferably the rear wheel is large enough to roll over moderately sized obstacles. An optional skid plate beneath the basket protects the frame and enables it to "slide" over obstacles if it makes contact with the ground. Twin frame forks are joined at their rears to the wheel over its axle ends. The front of each fork is articulated to the frame rear.

The trailer dynamically tracks the user during motion. An adjustable yoke assembly coaxially coupled at one end to the frame supports an articulated harness assembly worn by the user. In the best mode the trailer is designed for hands-free operability. The yoke assembly preferably comprises an upwardly angled yoke tube slidably coupled and pivoted to the frame front at the tube's lower end. Height adjustments are facilitated by the slidably adjustable, telescoping mounting of the yoke tube relative to the frame at the user end of the cargo basket. This allows the trailer to be shortened or lengthened to accommodate various user heights.

Preferably the trailer is designed to fold—allowing a more compact unit for transport with the ability to be carried on the users back while crossing challenging terrain. The folding rear triangle that houses the wheel serves a possible secondary function, acting as a dampening system that absorbs minor trail shock.

The yoke tube extends angularly forwardly to an upper main bearing assembly forming a harness pivot. Thus the harness assembly is dynamically connected to swivel relative to the frame. The harness assembly comprises a forwardly projecting belt surmounting the users waist, enabling comfortable hands-free operation. The preferred pivotal mounting of the yoke assembly provides a flexible joint between the user and the load, and, more importantly, helps steer the trailer when user movements cross the centerline.

In an alternative form of the invention, the yoke assembly is provided with optional forwardly projecting handles facilitating precise maneuverability and comfort. An optional handbrake associated with the handles core actuates a brake mechanism on the rear wheel(s).

The relatively plentiful cargo room provided by the basket allows relatively large, cumbersome or bulky articles, such as a standard backpack, for example, to be transported. The cargo basket is roomy enough to accommodate infant seats, rescue boards, cargo nets, liquid carriers, and the like. Since the cargo basket is disposed relatively close to the ground, the center of gravity is relatively low to enhance trailer stability. Further, as the harness assembly comfortably connects to the body of the user below his or her back or spine, it is easier to walk and negotiate the twists and turns of outdoor pathways or trails.

Thus a basic object is to provide a human-powered, multi-use trailer or trailer for hauling miscellaneous articles that distributes weight between a wheel (or wheels) and the hips of the user.

Another basic object is to carry a conventional backcountry backpack.

A related object is to provide a trailer of the character described that can either replace a conventional backpack or make it easier to carry it.

Another important object is to provide an article carrier that minimizes spinal stresses.

Another object of our invention is to evenly and comfortably place the human-borne portion of a load upon the user's hip structure rather than the spine.

A still further object is to provide a trailer of the character described suitable for walking, hiking, hunting, jogging or other recreational activities.

A related object is to provide a trailer of the character described that smoothly tracks or follows the user to enhance maneuverability. It is a feature of our invention that articulated joints connecting the wheeled trailer portion and the yoke harnessed to the user substantially increase maneuverability and dexterity.

Another object of our invention is to increase the users stability. By distributing the load more evenly, and by lowering the center of gravity, stability and ease of use are enhanced.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
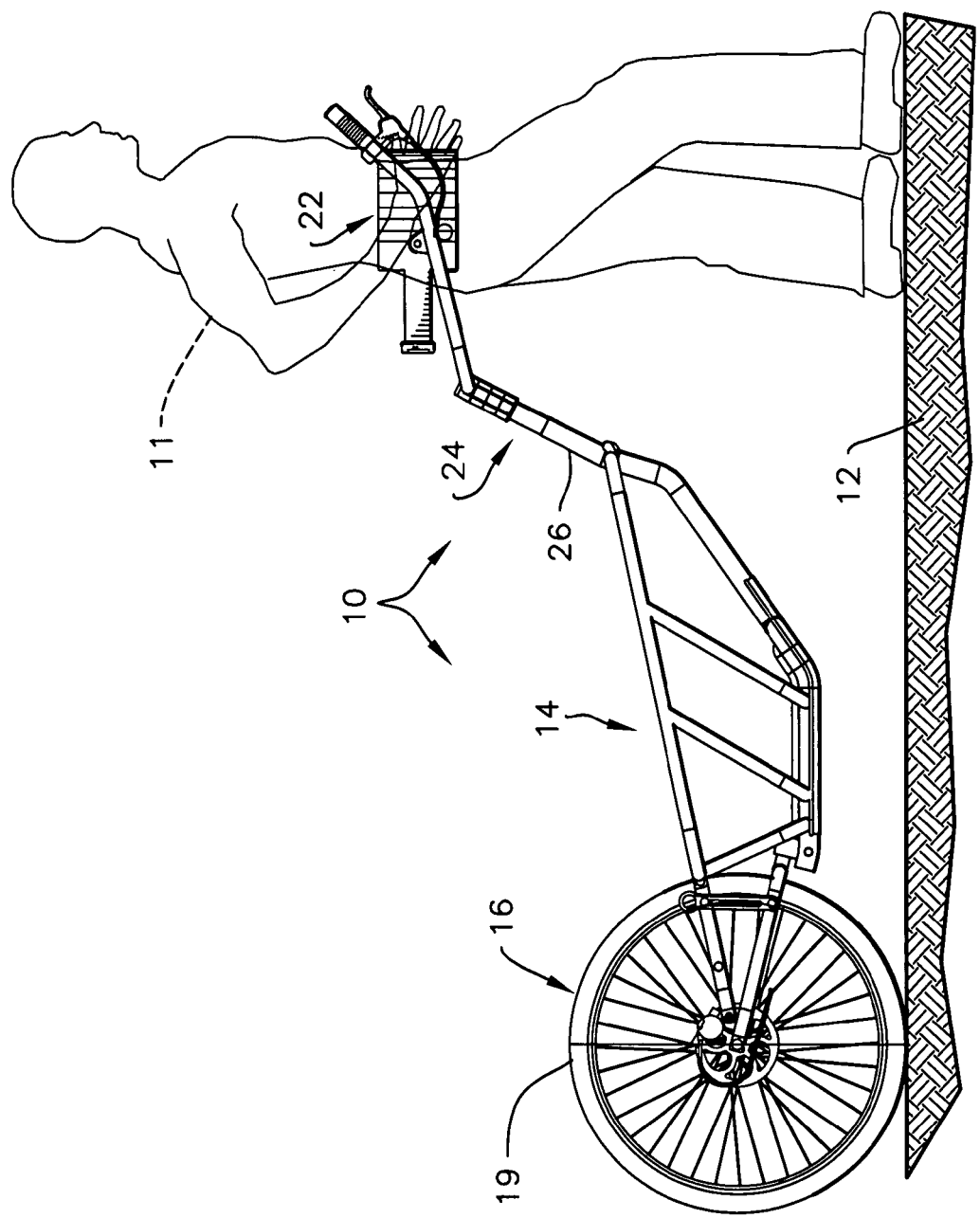
FIG. 1 is a side elevational view of the best mode of our new cart, illustrated in use over a typical surface.
Figure 2:
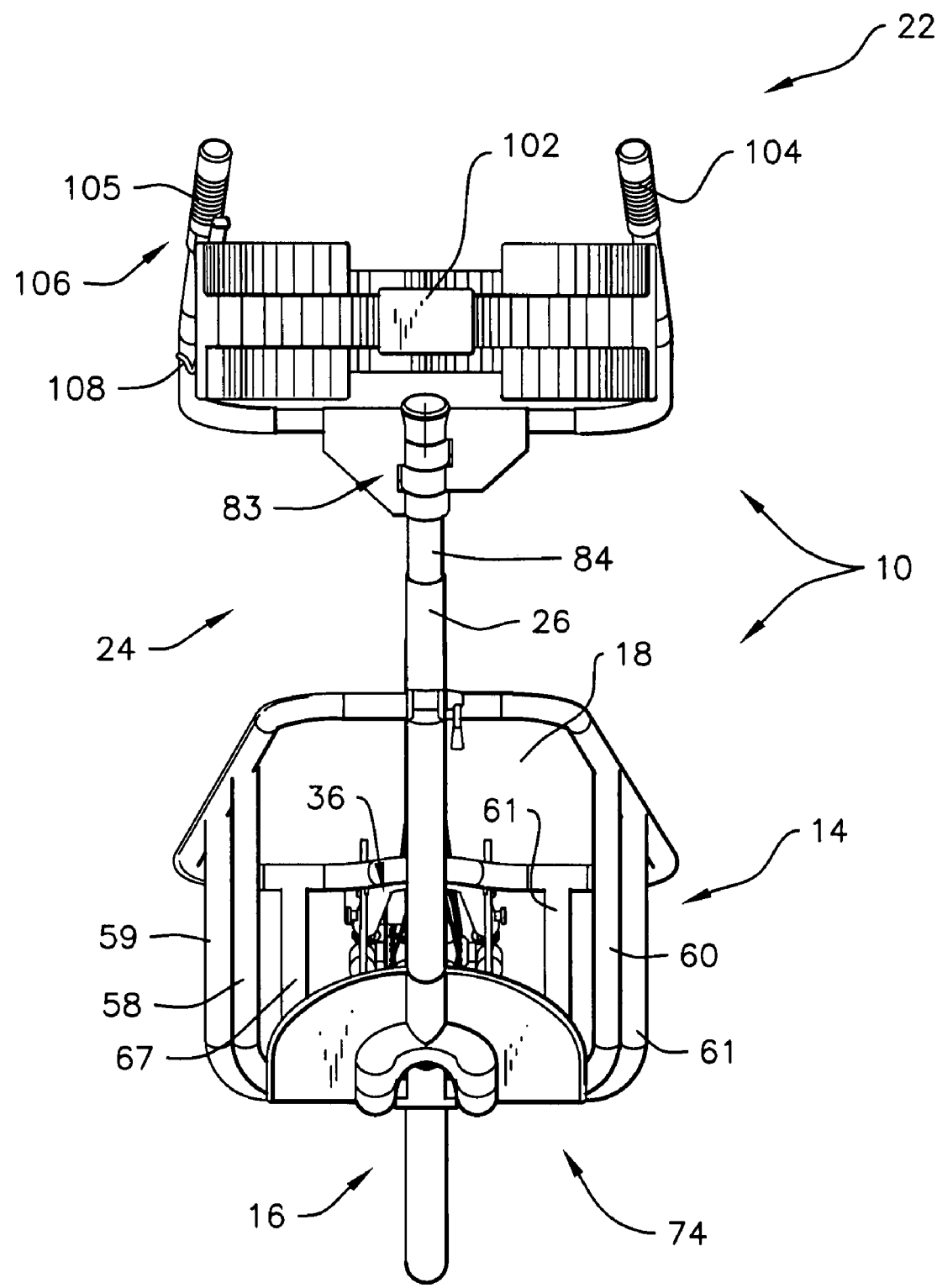
FIG. 2 is an front elevational view thereof.

With initial reference directed to FIG. 1 of the appended drawings, a cart constructed generally in accordance with the best mode of the invention has been generally designated by the reference numeral 10. A human user 11 shown in phantom lines can hook-up to the cart and tow upon a surface 12 over a suitable trail, path or walkway. Much of the weight of the cart, and its load, is distributed between the user's hips and the rear wheels(s), avoiding stresses upon the back or spine that would otherwise be caused by the weight of a heavily loaded backpack. In this manner the disadvantages with conventional backpacks, and prior art carts, are avoided. Further user advantages result from the fact that cart 10 dynamically reacts to twists and turns encountered during normal use, and thus tracks the user 11 during motion over a variety of surfaces 12.

With additional reference directed now to FIGS. 2-10, a rigid, low-profile central frame 14 forming the middle of the trailer is disposed between the user 11 and the rear wheel 16. As described in more detail hereinafter, a cargo area 18 is defined between the frame sides. In the best mode, wheel 16 comprises a single, lightweight wheel, with a conventional bicycle tire 19. In the best mode a twenty to thirty inch diameter bicycle wheel is employed. Wheel 16 should be large enough to clear various obstacles and to stably roll over irregular terrain, bumpy, twisted, trails and the like.

In the best mode the cart 10 is designed for hands-free operability. It is preferred that an articulated harness assembly 22 be coupled about the waist of the user 11, resting upon his or her hips. The frame has an adjustable yoke assembly 24 coaxially coupled to it at the frame front. The bottom end of the yoke assembly 24 is coaxially coupled to the frame 14 and adjustably supports the harness assembly 22 worn by the user 11. The yoke assembly 24 preferably comprises an upwardly angled yoke tube 26 slidably coupled and pivoted to the frame front at the tube's lower end. Height adjustments are facilitated by the slidably adjustable, telescoping mounting of the yoke tube 26 relative to the frame at the user end of the cargo basket. This allows the trailer to be shortened or lengthened to accommodate various user heights.

Figure 8:
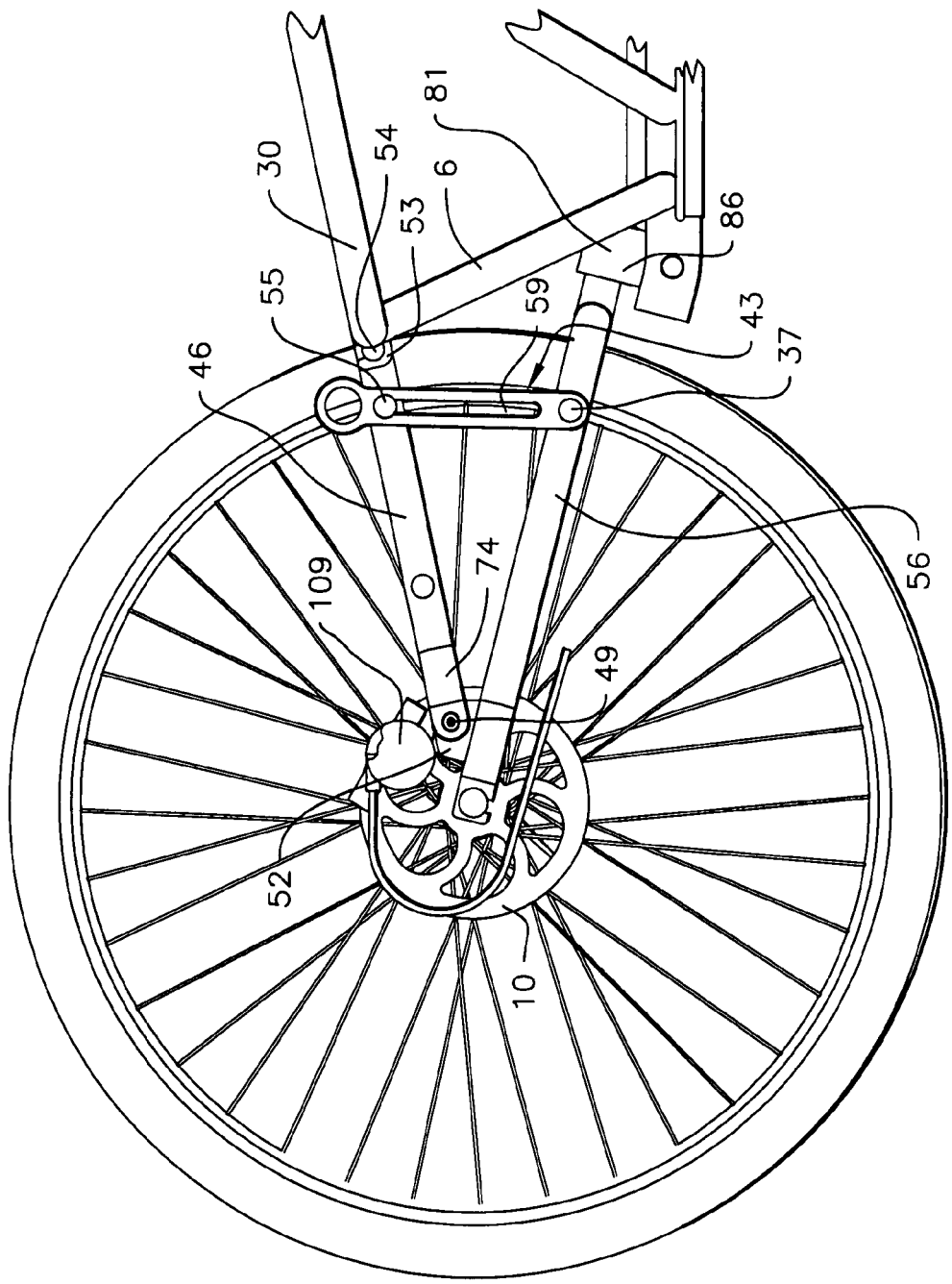
FIG. 8 is an enlarged, fragmentary elevational view derived from circled region 8 in FIG. 6.
Figure 9:
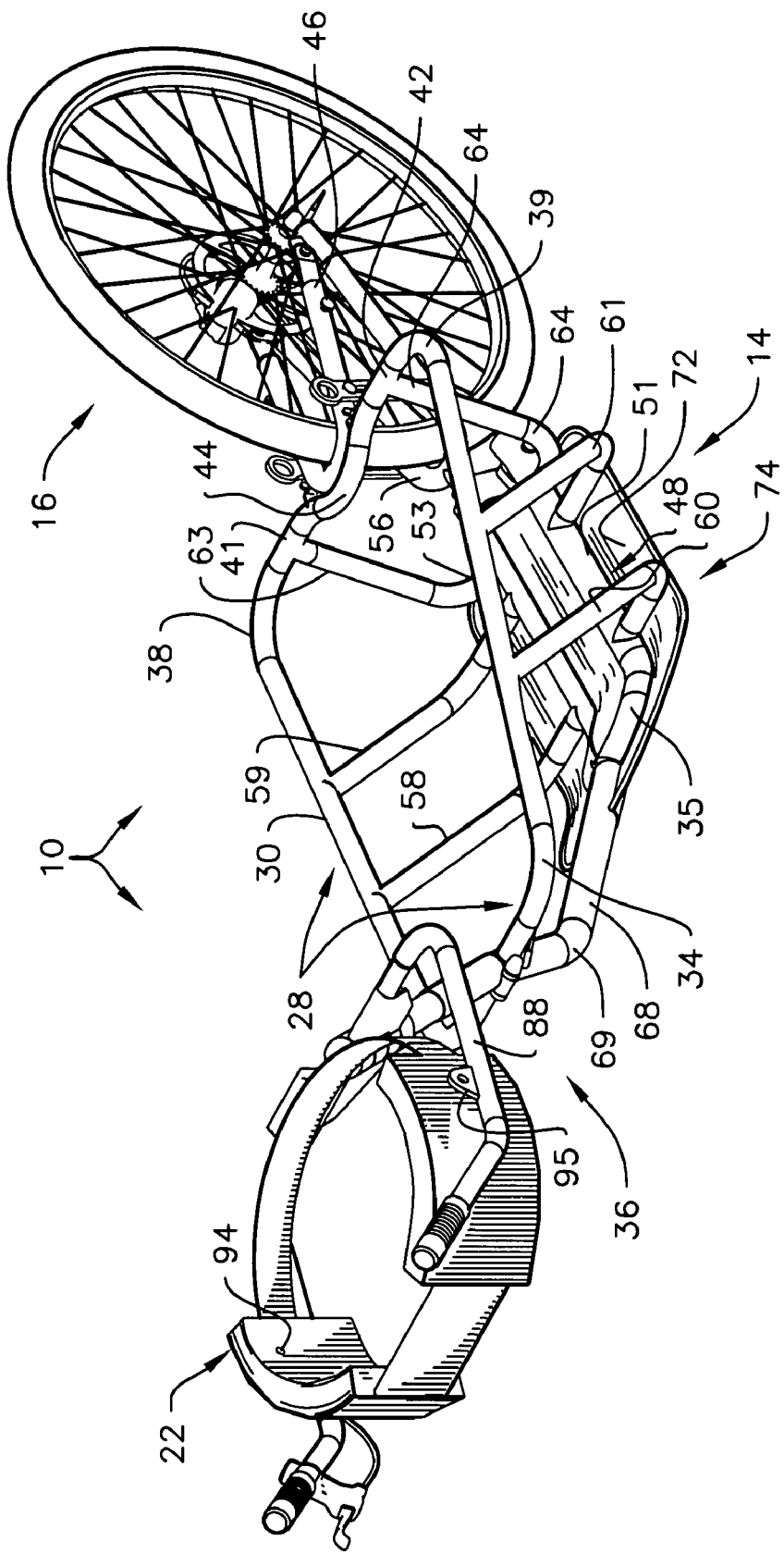
FIG. 9 is a frontal isometric view thereof.
Figure 14:
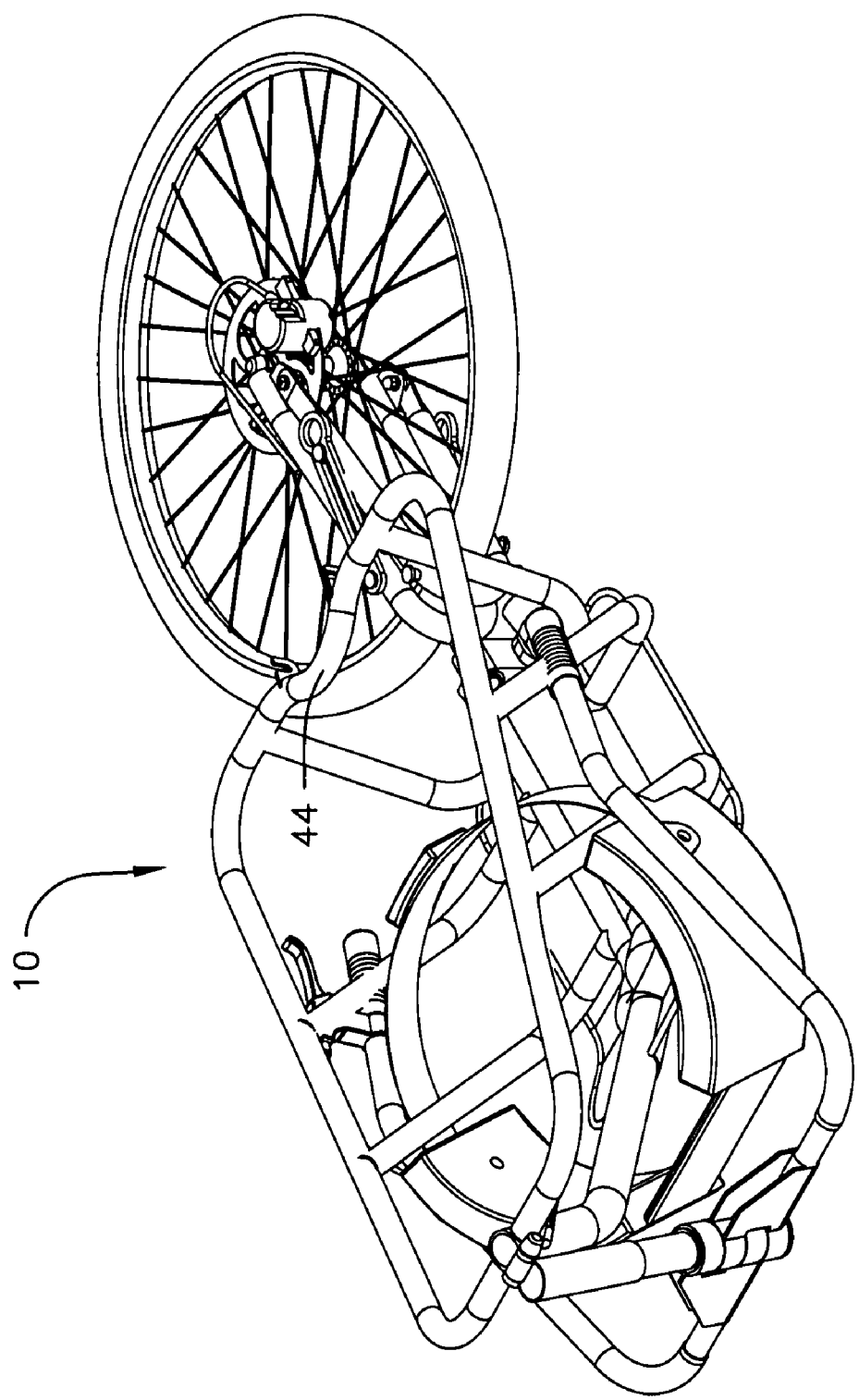
Figure 15:
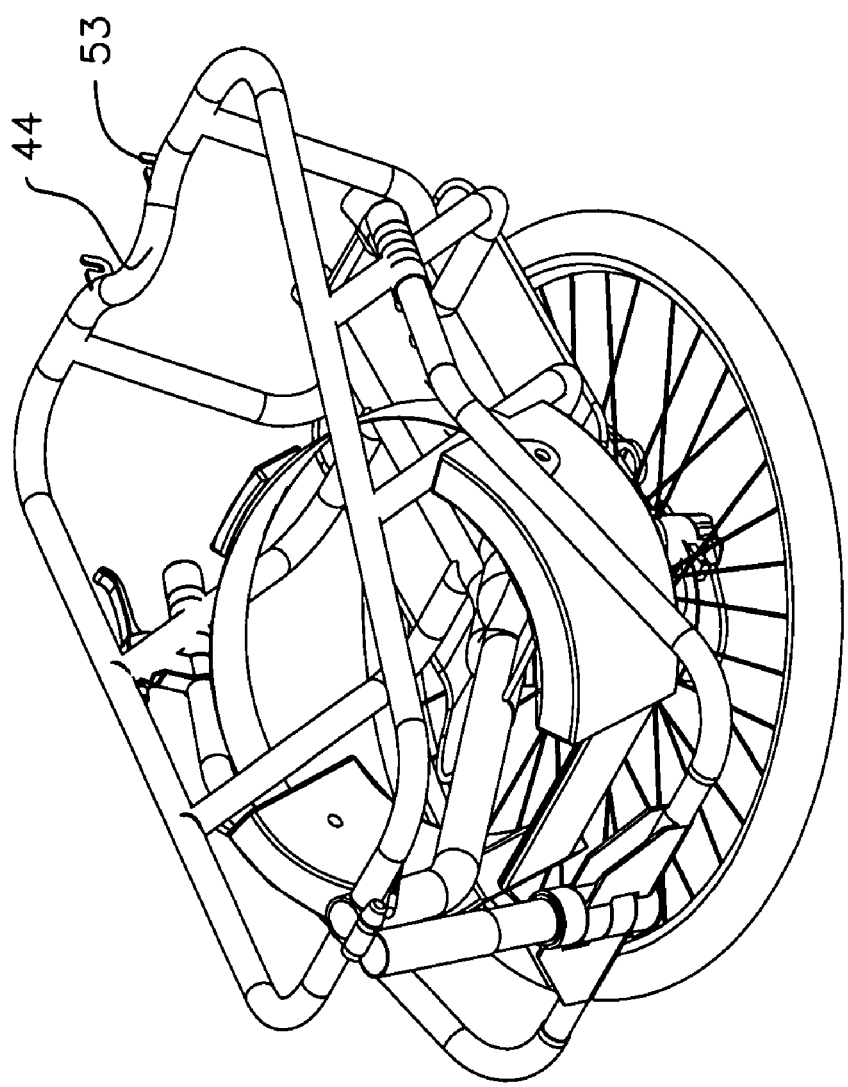

As best seen in FIGS. 4-6 and 9, the frame 14 preferably comprises an upper, peripheral subframe 28, which is shaped generally like a trapezoid. The upper subframe sides 30 and 31 converge toward the subframe front, and are connected by elbows 33 and 34 respectively to a front articulated union 36. The upper subframe sides 30, 31 diverge towards the subframe rear, connecting to rear elbows 38, 39 respectively, which are in turn connected to unions 41, 42 (i.e., FIG. 9) that are interconnected by a somewhat arcuate connector 44. A rigid, generally U-shaped, rearwardly extending, upper fork 46 has a U-shaped vertex 45 and integral rear ends 47 (FIGS. 8, 11) connected by suitable fasteners 49 (FIG. 8) to idler flanges 52 sandwiched against the wheel 16 about its axle. Upper fork 46 is movable when desired for folding the cart 10. Vertex 45 is normally positioned adjacent subframe connector 44 in operation, as illustrated in FIGS. 8, 9, and 14. As best seen in FIGS. 8 and 15, there are support hooks 53 extending from subframe connector 44; these mate with cylindrical bosses 54 projecting from opposite sides of vertex 45 at the front of the upper fork 46. When assembled for use the upper fork 46 is secured by the bosses 54 engaged by hooks 53. Additional support is provided by slotted rubber tensioners 43 (FIG. 8) that are pivoted to lower fork 56 by fasteners 37. A projecting follower 55 is slidably captivated within follower slot 59 of tensioners 43 to maintain the upper and lower forks in substantial alignment during folding, as in FIG. 14.

Figure 3:
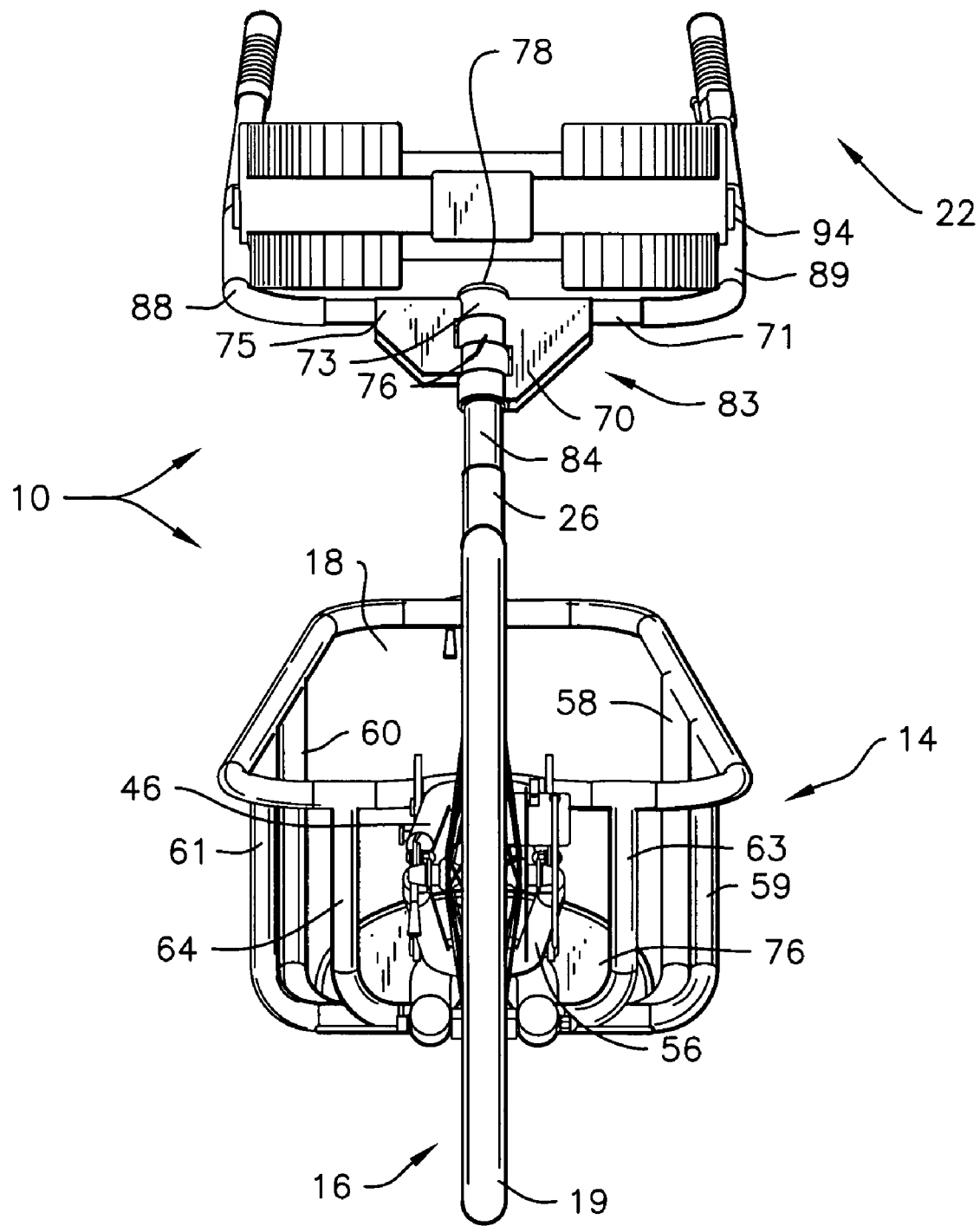
FIG. 3 is a rear elevational view thereof.
Figure 4:
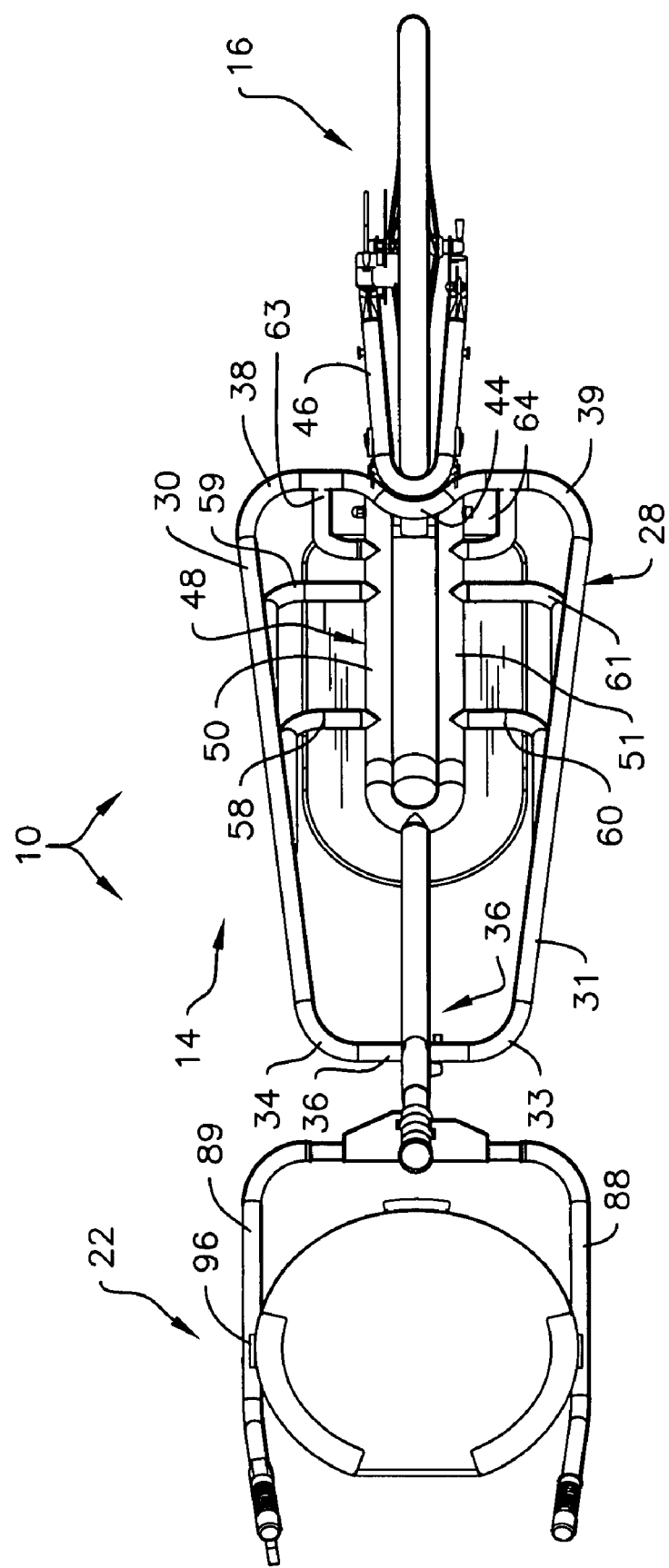
FIG. 4 is atop plan view thereof.

The lower subframe 48 comprises a pair of substantially parallel sides 50 and 51 extending rearwardly to structure explained below that mounts lower fork 56 (i.e., FIG. 5) whose rear ends are conventionally connected across the wheel axle. The upper and lower subframes 28 and 48 are reinforced on their sides near the front of frame 14 by angularly vertically extending side braces 58, 60, and 61 (FIGS. 3, 9). Rear subframe brace 61 and 63 (FIG. 9) connect the subframes 28, and 48 at their rears. The front of each lower subframe side 50, 51 connects to a rigid, U-shaped bridge 35 (FIG. 9) that supports brace 68 connected through elbow 69 (FIG. 9) to upper, articulated union 36. The lower subframe 48 mounts an optional skid plate 72 that completes the bottom of the cargo area 18, forming a basket-like enclosure between itself and side braces 58, 60, and 61 and the subframes 28 and 48.

Figure 5:
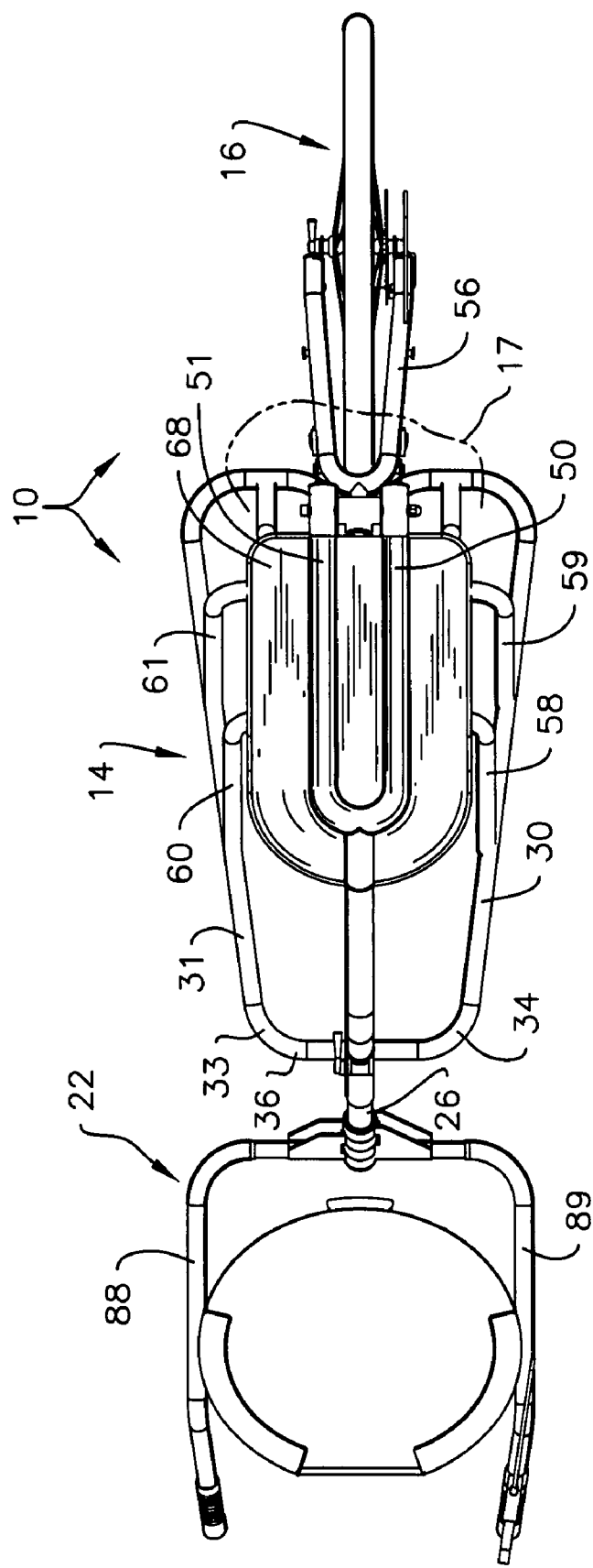
FIG. 5 is a bottom plan view thereof.
Figure 6:
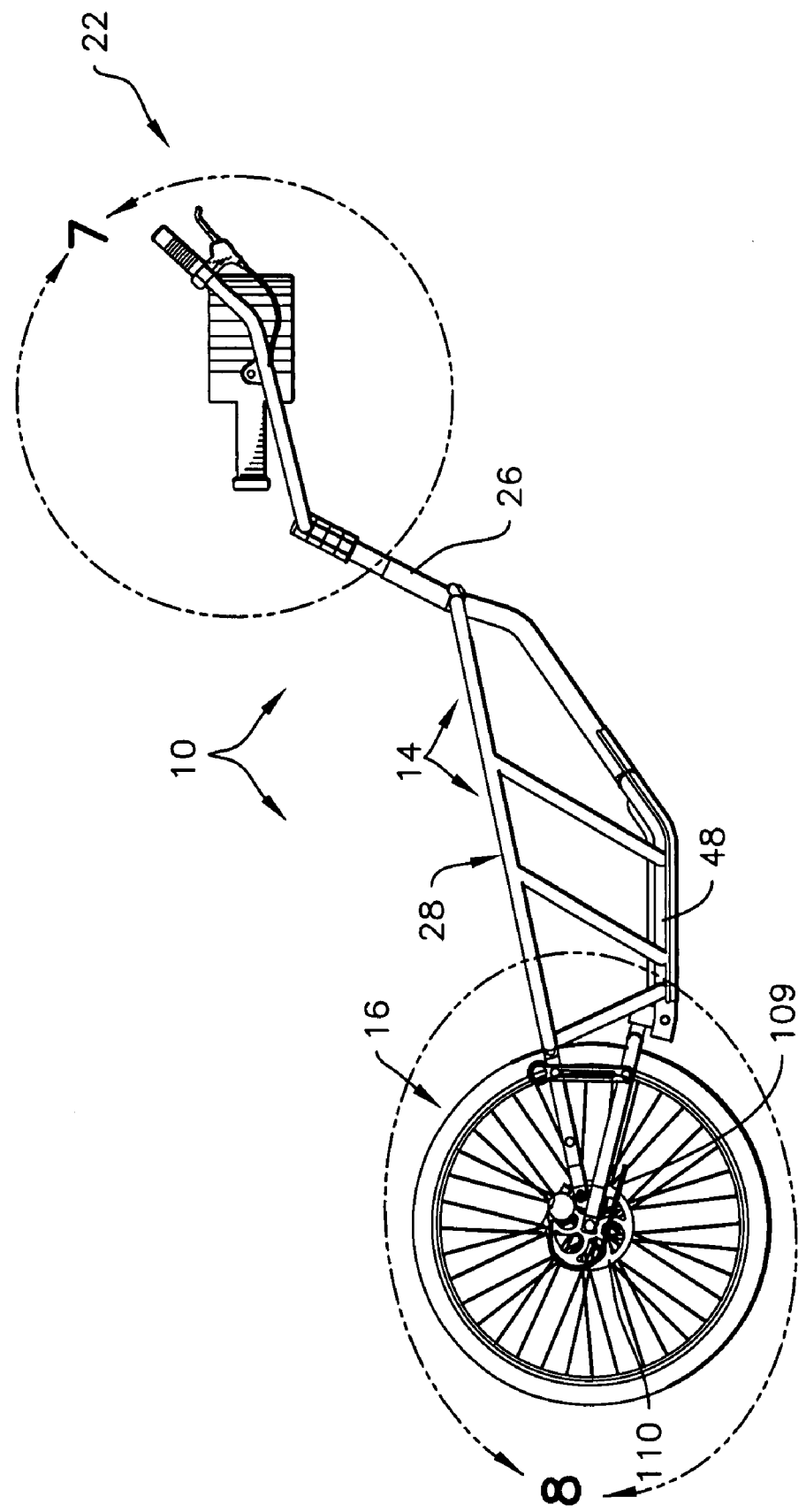
FIG. 6 is a side elevational view similar to FIG. 1.
Figure 17:
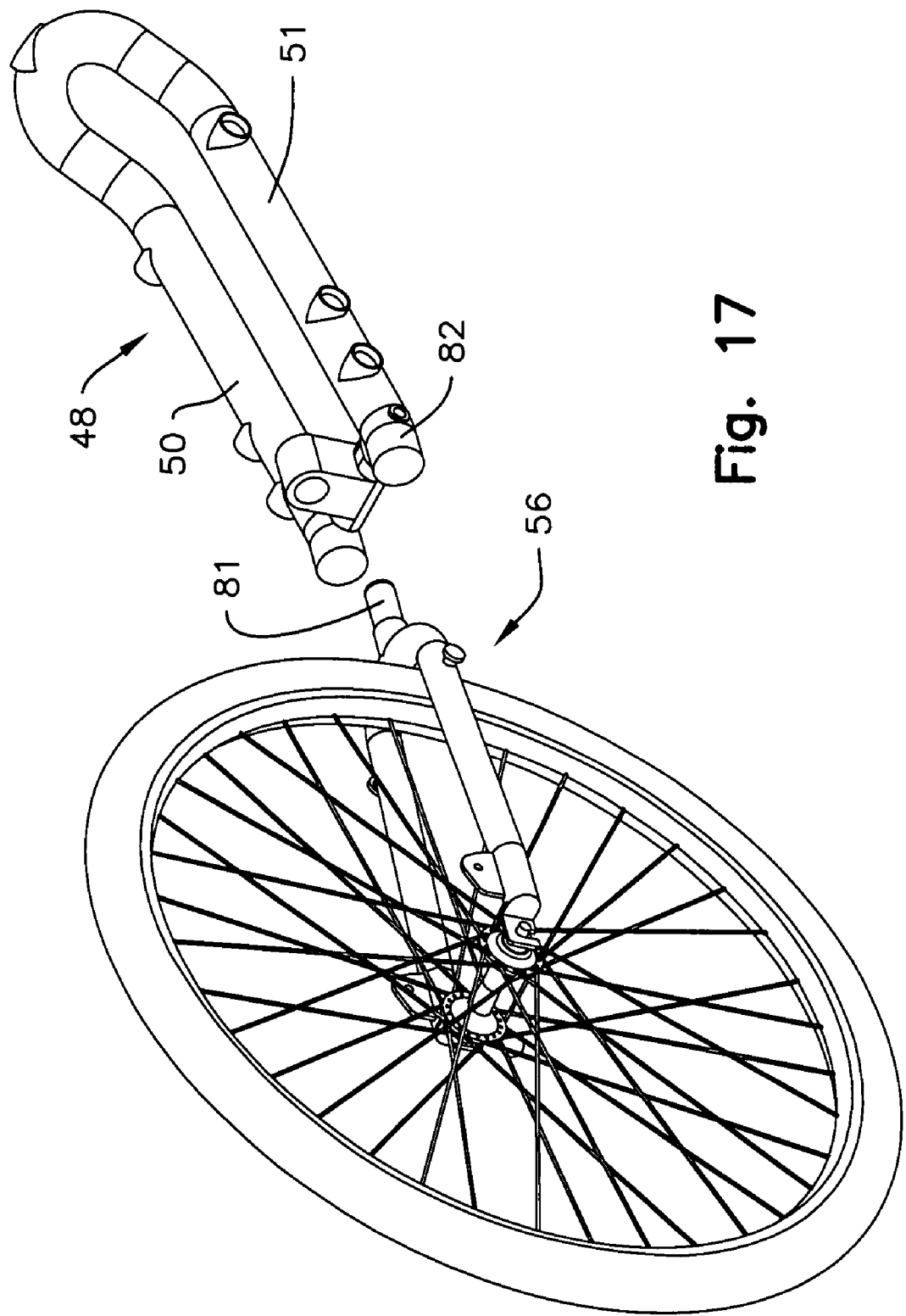
FIG. 17 is an enlarged, fragmentary partially exploded isometric view of the lower fork, derived from circled region 17 of FIG. 5; and, FIG. 18 is an enlarged isometric view of the preferred rear fork articulator.
Figure 18:
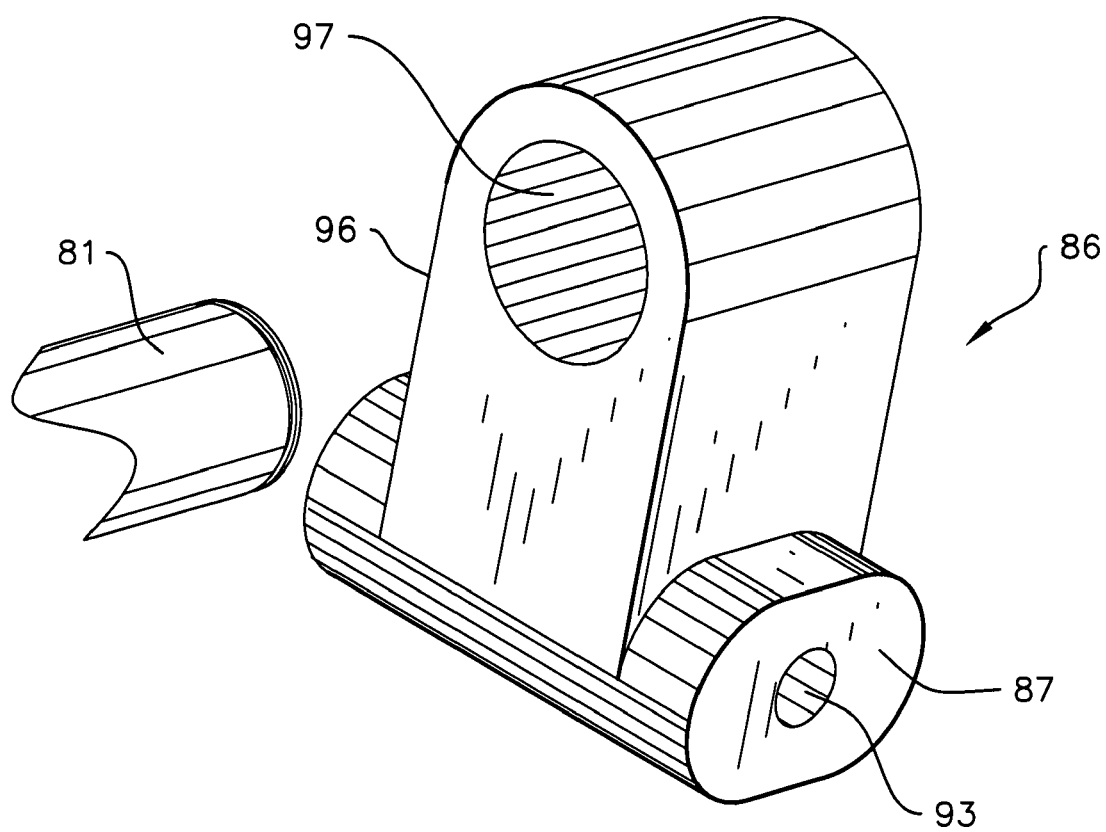

With joint reference now directed to FIGS. 5 and 17-18, the lower fork 56 comprises an arcuate front 80 from which an axle stub 81 projects. The ends of sides 50, 51 of the lower subframe 48 (FIG. 17) have bearings 82 including internal axles (not shown) that engage articulator 86 (FIG. 18). The bearing axles penetrate mandrels 87, journaling articulator 86 about orifices 93. The articulator body 96 thus can swing in an arc about orifices 93. The articulator body 96 has an orifice 97 that receives the axle stub 81 projecting from the lower fork. Orifice 97 is disposed perpendicularly relative to orifices 93.

The rear fork, and thus the wheel 16, can be is swiveled by axle stub 81. In other words the lower fork can twist relative to the subframe.

Figure 13:
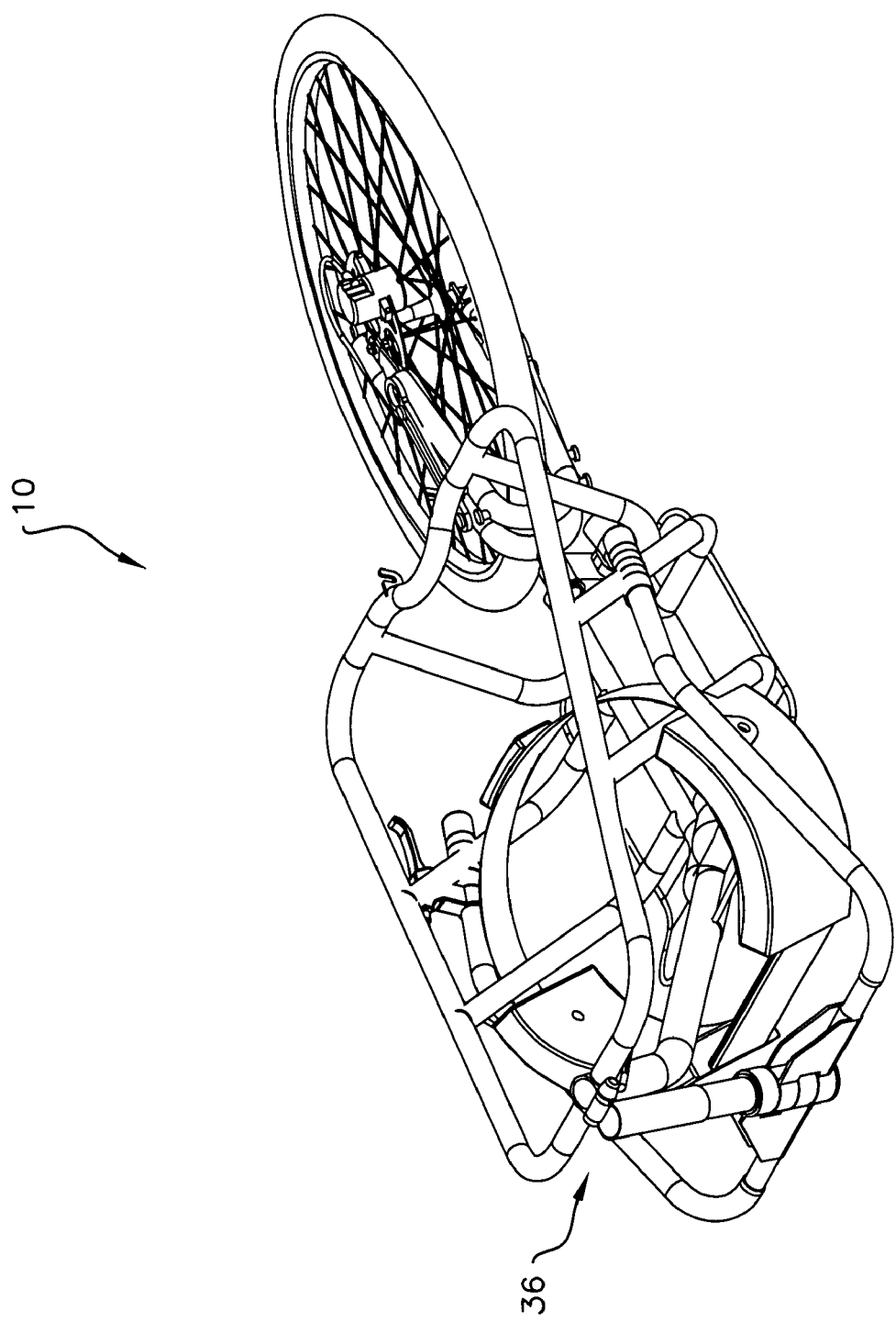

When the cart 10 needs to be folded, the upper fork can be disconnected by first uncoupling the upper fork by unengaging bosses 54 (i.e., FIG. 8) from hooks 53. The orientation of the upper fork relative to lower fork 56 will be partially maintained by the follower slot 59 (FIG. 8) discussed earlier. The lower fork (and the upper) will be twisted about the stub 81 which is torsionally deflectable relative to the subframe thanks to articulator 86 (FIGS. 17, 18). As such twisting occurs, the position illustrated in FIG. 13 is assumed. Then the twisted forks and wheel are rotated, as enabled by the journalled articulator 86, so the wheel is positioned in a compact position as in FIG. 15.

Figure 10:
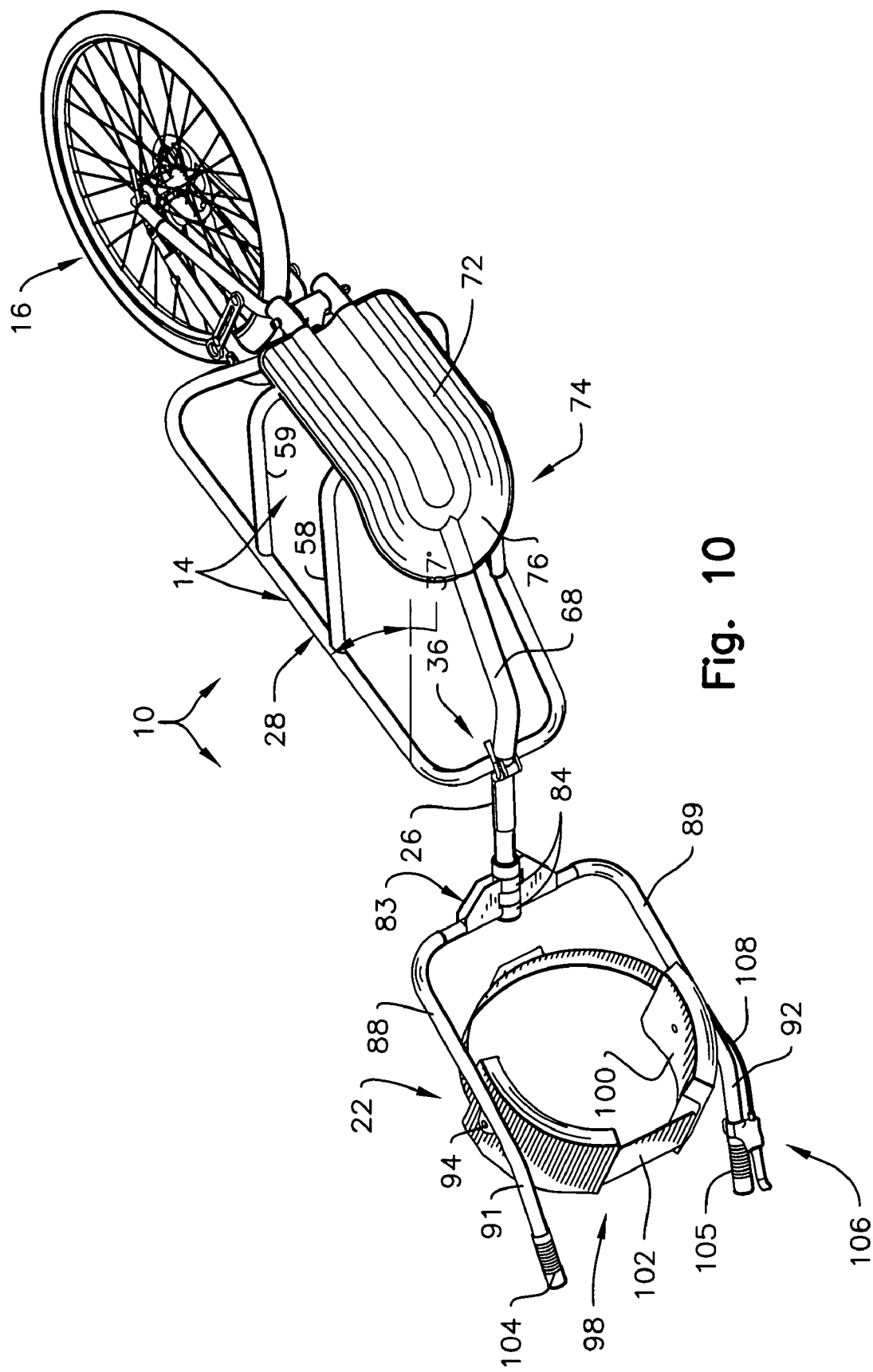
FIG. 10 is a bottom isometric view thereof.

With attention directed to FIGS. 9-10, the frame's yoke tube 26 extends angularly forwardly and upwardly from the preferred one-way articulated union 36 to an upper main swivel assembly 83 forming a binary harness pivot, which enables different sides or arms of the harness assembly to pivot independently from one another. In the best mode the harness assembly 22 is dynamically connected to swivel relative to the frame 14. The yoke tube 26 has an internally coaxially coupled tube element 84 extending from it that is telescopingly adjustably received within the swivel assembly 83. Thus the yoke tube length is adjustable because of coaxially linked tube element 84.

Figure 11:
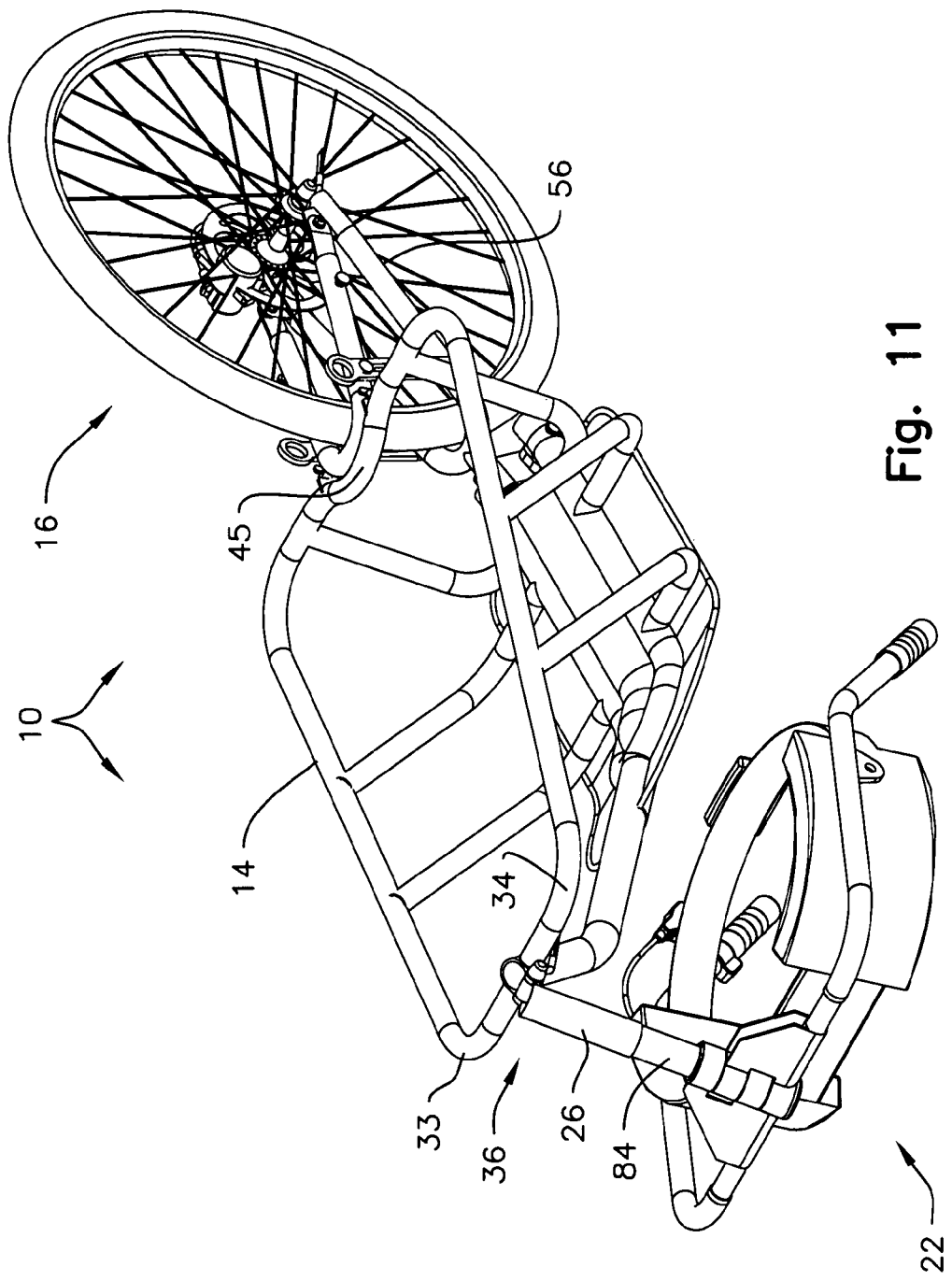
FIGS. 11-15 are isomeric views showing how the trailer folds in the best mode; and, FIG. 16 is an enlarged, fragmentary isomeric view of the articulated union used in the best mode to enable folding of the yoke tube and the front harness assembly.
Figure 12:
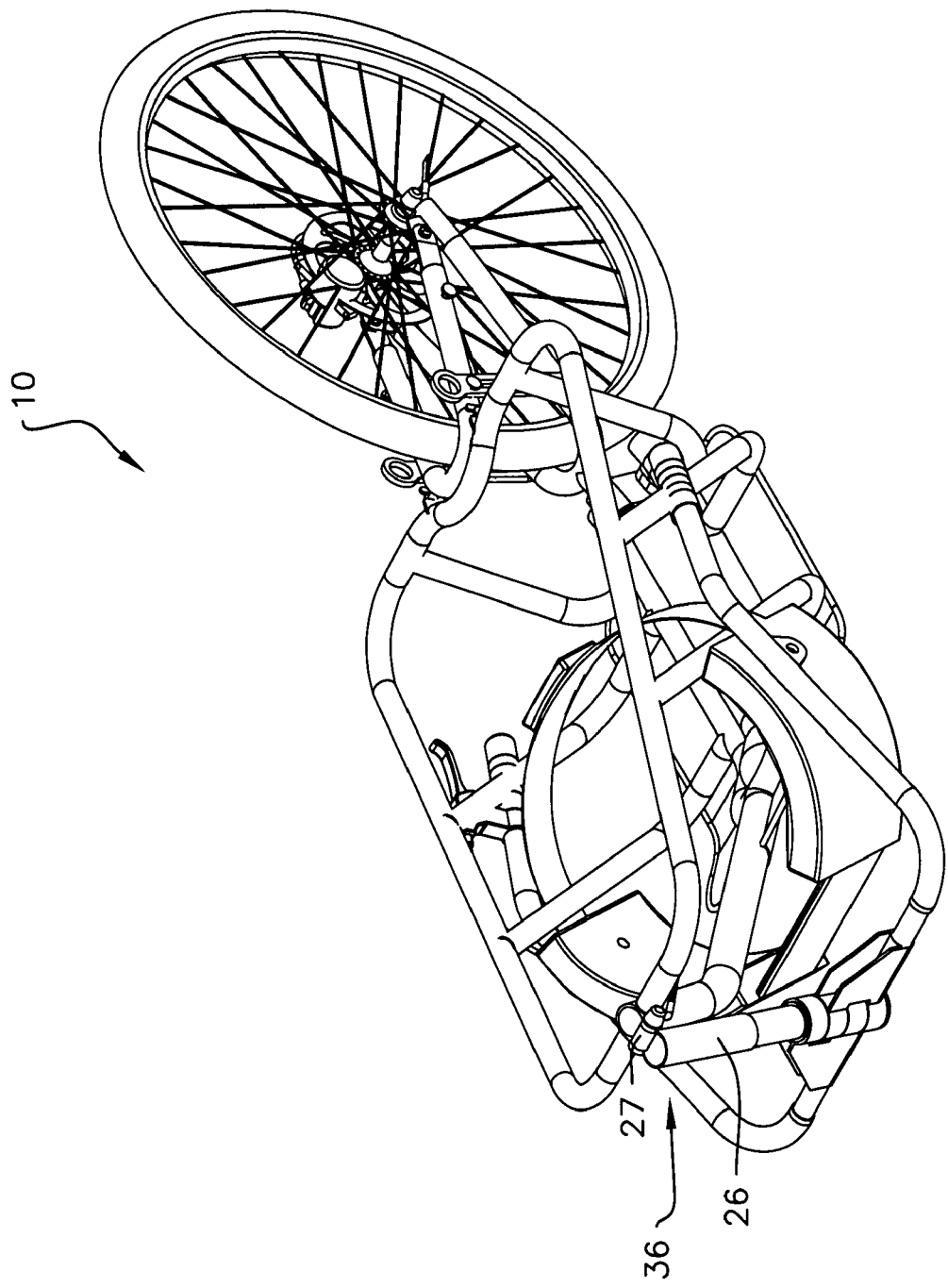
Figure 16:
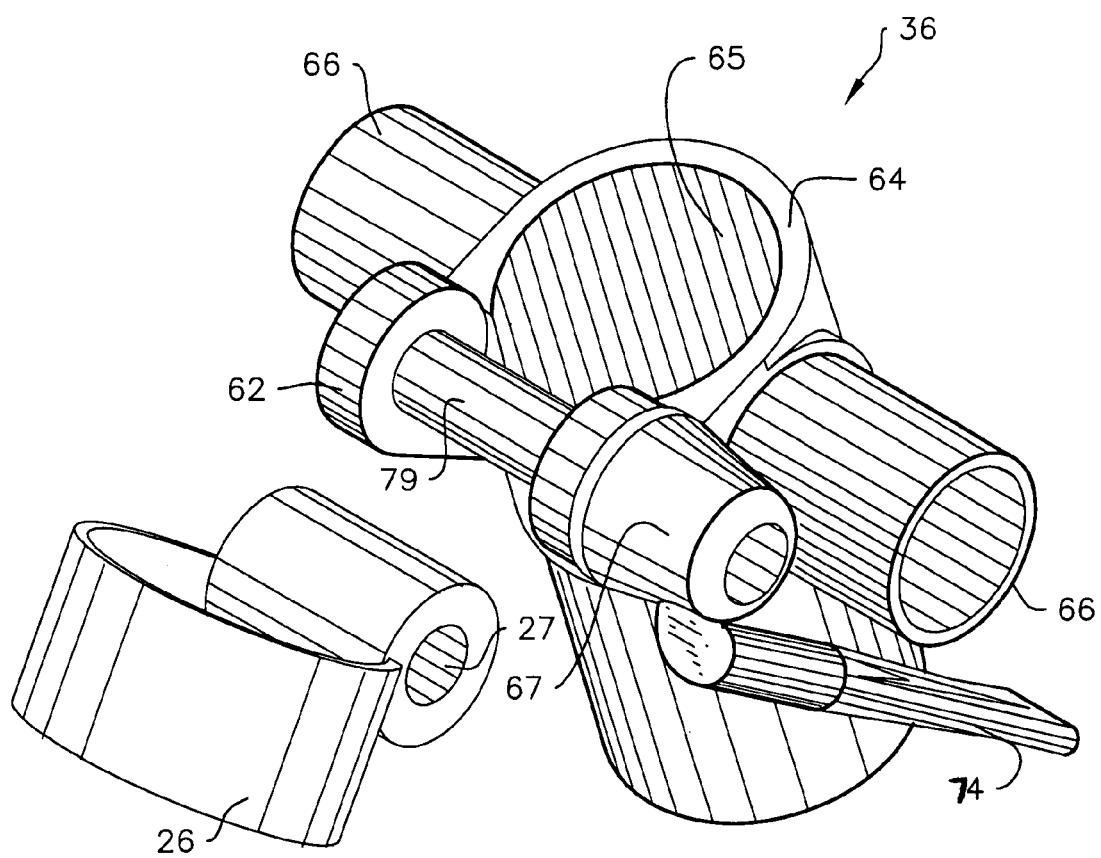

Referring to FIGS. 11 and 16, the articulated union 36 enables the yoke tube 26 to be folded, moving the harness assembly and handles beneath the cargo area 18 (once the belt is unfastened) for compact storage or transportation. Union 36 comprises a central sleeve 64 whose interior 65 aligns with the yoke tube 26. Transverse sleeves 66 are connected to elbows 33, 34 (FIG. 11) described earlier. A friction hub 67 threadably mounts a lever 74, that controls an anchor bolt threadably received by anchor 62. Pin joint 79 penetrates spindle 27 projecting from the bottom of yoke tube 26 (FIG. 16). When threaded pin 79 is tightened by movement of lever 74, spindle 27 is compressed between hub 67 and anchor 62. When the lever is released, yoke tube 26 can rotate downwardly and forwardly, enabling the configuration of FIGS. 12 and 14.

Figure 7:
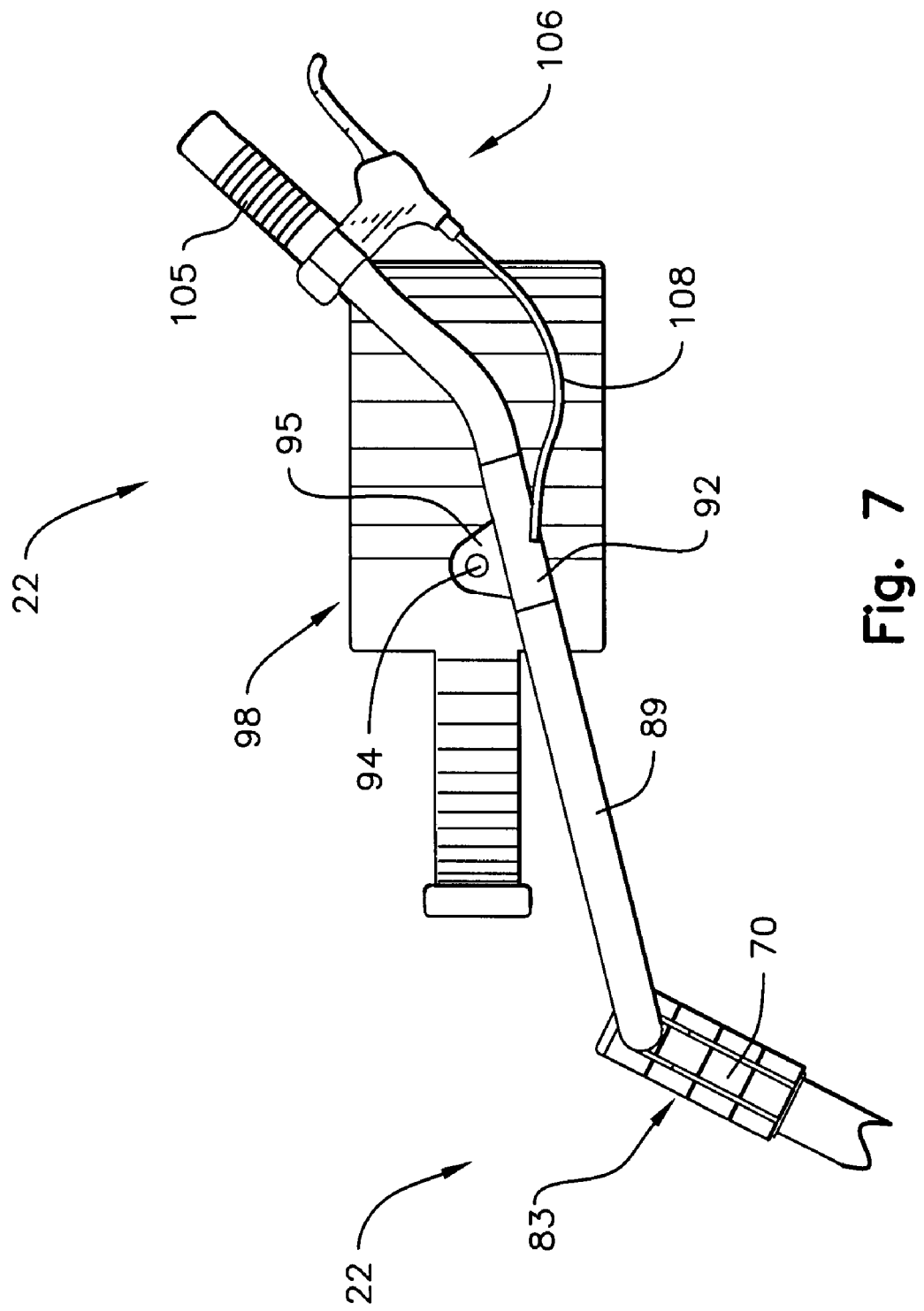
FIG. 7 is an enlarged, fragmentary elevational view derived from circled region 7 in FIG. 6.

As best seen in FIGS. 3, 7 and 10, the harness assembly 22 preferably comprises a pair of forwardly projecting, spaced-apart arms 88 and 89 (FIG. 10) connected to arm tubes 91 and 92 respectively. Each harness arm 88 and 89 is dynamically pivotal independently from the other because of the binary swivel assembly 83. As best illustrated in FIG. 3, the binary swivel assembly 83 comprises a first, generally triangular web 70 rigidly coupled via welding or the like at its upper side to harness assembly arm 89 via extension 71. Web 70 has a pair of vertically spaced part sleeves 73 penetrated by element 84. Similarly, arm 88 is coupled to a companion web whose sleeves 76 are interlaced with sleeves 73, so that arms 88, 89 independently swivel relative to the user 11 and the yoke tube 26. Cap 78 secures the webs 70 and 75 and their interlaced sleeves 73 and 76. The independent swiveling enabled by these sleeves facilitates a customized fit to the users waist, and promotes dynamic twisting and turning during user movement, allowing the cart 10 to maintain an upright and stable orientation during movements over rough terrain encountered along a surface 12 over terrain that may be bumpy, irregular, and curved.

As best seen in FIG. 7, tubes 91 and 92 each support an upwardly extending belt tab 95 between which a belt assembly 98 is swiveled. With additional reference to FIG. 10, the belt assembly 98 comprises a pair of inner radially spaced apart, support pads 100 securing an adjustable waist belt 102 that can be adjusted for an appropriate tightness in the conventional manner. The belt assembly 98 is secured between pivots 94. It can be reversed in position such that the pads 100 are positioned over either the front or rear of the users hips. The belt and pads surmount the users waist and placing weight upon his or her hips, enabling comfortable hands-free operation. The preferred pivotal mounting of the harness assembly 22 as described provides a flexible joint between the user and the load, and, more importantly, helps steer the trailer when user movements cross the centerline generally defined by yoke tube 26. Importantly, the binary swivel assembly 83 allows different sides of the harness assembly (i.e., tubular arms 88, 89) to independently deflect towards or away from the user's body.

In an alternative form of the invention a pair of optional, forwardly projecting handles 104, 105 (i.e., FIGS. 7, 10) project away from arm tubes 91 and 92 respectively. Arm tube 92 additionally supports a conventional handbrake 106 connected via cable 108 to a conventional rear brake actuator 109 (FIG. 6) that selectively frictionally grasps brake disk 110 for braking. The optional handles 104, 105 facilitate maneuverability, comfort, and control, especially when large loads are transported, or extremely irregular terrain is traversed. When, for example, the user 11 draws cart 10 downhill over an extreme grade, such as those encountered over mountain biking trails, the handles and the brake readily enable stable control.

The relatively plentiful cargo room provided by the cargo area 18 allows relatively large, cumbersome or bulky articles, such as a standard backpack, for example, to be transported. The cargo basket is roomy enough to accommodate infant seats, rescue boards, cargo nets, liquid carriers, etc. Since the cargo basket is disposed relatively close to the ground, the center of gravity is relatively low to enhance trailer stability. Further, as the harness assembly comfortable connects to the body of the user below his or her back or spine, it is easier to walk and negotiate twists and turns of outdoor pathways or trails.

Self-steering capability is enhanced by the critical angles created by the intersections of the structures occupying the centerline of the cart 10. As viewed in FIGS. 3 and 9, the cart centerline is defined by tire 19, the lower subframe, and yoke tube 26. The centerline extends between the lower subframe sides 50, 51 through the center of the cargo area 18 to the upper and lower forks 46, 56 (i.e., FIG. 3). Because of the depicted frame structure, any load in cargo area 18 is carried below the center of gravity of the cart 10.

The swivel assembly 83 allows the trailer to smoothly swing through a natural arc to follow the users movements and works in conjunction with the single rear wheel to allow the trailer to tip or lean to either side as the user's body turns. As the device leans/swings off axis—the wheel 16 of the trailer leans and the frame 14 basically rotates about its centerline carving an arc and follows the user's path.

The trailer's ability to return to a straight up or centered position is dependent upon having the combined weight of the trailer and gear below the center of gravity. To attain proper balance, the lowest point of the trailer, occupied by the skid plate 72, needs to be an appropriate distance below the axle of wheel 16. This geometry (aided by the friction reducing bearings in the swivel assembly 83) causes the trailer to return to vertical on its own when the user straightens out from a maneuver. The pivot points at the attachment of waist belt allows vertical declination. Control is maintained by adhering to proper geometry and critical angles and by describing each axis separately rather than creating an unstable joint such as a universal or flexible joint.

In the best mode the trailer is designed to fold, allowing a more compact unit for transport with the ability to be carried on the users back while crossing challenging terrain. The folding of the yoke tube and harness assembly between the positions of FIG. 1 and FIGS. 12 and 14, for example, has already been explained in prior discussion of FIG. 16.

In addition however, the rear wheel 16 is foldable to allow the rearmost and foremost segments of the device to collapse toward the basket. The rear section, consisting of the wheel and fork assemblies—and the forward section, consisting of the yoke arms, waist belt and vertical height adjustment components—both hingedly deflect towards the cargo area 18.

The upper fork 46 releases from its mounting point on the basket, folds down and secures against the lower fork arm—which is connected to an offset universal joint allowing the complete fork assembly to pivot and rotate to its storage position below the basket. One axis of the joint defines the vertical swing of the rear wheel and fork assemblies and is offset from the second axis to ensure that the assembly rotates to a flat position underneath the basket—recessing into the frame as allowed by the split main beam/spar.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A human-powered, hands-free cart for hauling miscellaneous articles, said cart comprising:
   a rigid frame comprising a front, a rear; an upper subframe, and a lower subframe;
   a cargo area defined within the frame between said upper and lower subframes;
   a wheel;
   an upper fork articulated to the upper subframe at the frame rear and coupled to said wheel;
   a lower fork articulated to the lower subframe at the frame rear and coupled to said wheel;
   an adjustable yoke assembly pivotally coupled to the frame front; and,
   an articulated harness assembly supported by the yoke assembly, the harness assembly comprising an adjustable belt worn by a user that shifts much of the weight to the user's hip.

2. The cart as defined in claim 1 wherein said yoke assembly comprises yoke tube slidably mounted to the yoke assembly to permit slidable adjustments relative to the frame.

3. The cart as defined in claim 2 wherein said yoke tube extends from said frame to an upper swivel assembly that pivots said harness assembly.

4. The cart as defined in claim 3 wherein said harness assembly comprises a pair of arms, each coupled to said swivel assembly, and said swivel assembly is binary, enabling said arms to pivot independently from one another.

5. The cart as defined in claim 4 wherein the yoke tube has a telescopic element coaxially coupled to the yoke tube for slidable adjustability to allow the cart to be shortened or lengthened to accommodate various user heights.

6. The cart as defined in claim 5 wherein the yoke tube is pivoted to the frame front by an articulated union to enable cart folding.

7. The cart as defined in claim 1 further comprising:
   an upper fork removably extending from the upper subframe to idlers on said wheel;
   a lower fork pivotally extending from said lower subframe to an axle of said wheel; and,
   tensioner means extending between said upper and lower forks for aligning and securing said upper and lower forks.

8. The cart as defined in claim 7 wherein said lower subframe comprises an articulator journalled to said subframe for twistably mounting and pivoting said lower fork.

9. A human-powered cart for hauling items over various surfaces while walking or hiking, said cart comprising:
   a front, a rear, and a middle;
   a rigid, low-profile frame at the cart middle comprising an upper subframe, a lower subframe, and a plurality of braces connecting said upper and lower subframes;
   a cargo area defined between the subframes and said braces;
   at least one wheel at the rear of said cart;
   an articulated harness assembly at the front of said cart comprising belt means adapted to be coupled about the waist of a user in contact with the user's hip for towing the cart;
   an adjustable yoke assembly at the frame front for mounting the harness assembly, the yoke assembly comprising an elongated, telescopically connected yoke tube for enabling slidable adjustability to allow the cart to be shortened or lengthened to accommodate various user heights, the yoke tube pivoted to the frame front by an articulated union enabling cart folding;
   an upper fork extending from the upper subframe to said wheel and a lower fork extending from said lower subframe to said wheel; and,
   swivel means disposed atop said yoke assembly for mounting said harness assembly.

10. The cart as defined in claim 9 further comprising tensioner means extending between said upper and lower forks for aligning and securing said upper and lower forks.

11. The cart as defined in claim 9 wherein:
   there are idler flanges sandwiched about an axle of said wheel; and,
   said upper fork has a front and rear, said upper fork rear connects to said idler flanges and said upper fork front removably connects to said frame.

12. The cart as defined in claim 11 wherein said lower subframe comprises an articulator journalled to the subframe for twistably mounting and pivoting said lower fork.

13. The cart as defined in claim 12 wherein the lower fork comprises a projecting axle stub coupled to said articulator to aid in folding.

14. The cart as defined in claim 13 wherein:
   said harness assembly comprises a pair of forwardly projecting, spaced-apart arms; and,
   said swivel assembly is binary to dynamically swivel each of said arms independently.

15. The cart as defined in claim 14 wherein the swivel assembly comprises a pair of webs, each web connected to one of said harness assembly arms, and each web comprising sleeve means for independently swiveling each arm.

16. A human-powered cart for hauling items over various surfaces while walking or hiking, said cart comprising:

a front, a rear, and a middle;
a rigid, low-profile frame at the cart middle;
a cargo area defined at the frame middle;
a wheel at the rear of said cart;
an articulated harness assembly at the front of said cart comprising belt means adapted to be coupled about the waist of a user in contact with the user's hip for towing the cart and a pair of spaced apart arms;
a telescopingly adjustable yoke assembly at the frame front for mounting the harness assembly, the yoke assembly comprising an articulated union to enable cart folding;
binary swivel means disposed atop said yoke assembly for mounting said harness assembly such that each of said arms can independently swivel; and,
foldable fork means extending from said frame rear for securing said wheel.

17. The cart as defined in claim 16 wherein said fork means comprises separate upper and lower forks pivoted to said frame.

\* \* \* \* \*